(12) United States Patent
Yu et al.

(10) Patent No.: US 9,002,981 B2
(45) Date of Patent: *Apr. 7, 2015

(54) APPARATUS AND METHOD FOR TRANSMITTING/RECEIVING DATA IN COMMUNICATION SYSTEM

(71) Applicant: Electronics and Telecommunications Research Institute, Daejeon (KR)

(72) Inventors: Hee-Jung Yu, Daejeon (KR); Min-Ho Cheong, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 230 days.

This patent is subject to a terminal disclaimer.

(21) Appl. No.: 13/654,362

(22) Filed: Oct. 17, 2012

(65) Prior Publication Data

US 2013/0159458 A1 Jun. 20, 2013

(30) Foreign Application Priority Data

Oct. 17, 2011 (KR) .......................... 10-2011-0106082
Oct. 16, 2012 (KR) .......................... 10-2012-0114843

(51) Int. Cl.
*H04L 29/08* (2006.01)
*H04W 48/08* (2009.01)
*H04W 48/10* (2009.01)
*H04W 72/04* (2009.01)

(52) U.S. Cl.
CPC .............. *H04L 67/10* (2013.01); *H04W 48/08* (2013.01); *H04W 48/10* (2013.01); *H04W 72/042* (2013.01)

(58) Field of Classification Search
CPC .............. H04W 48/08; H04W 72/121; H04W 74/0808
USPC .................. 709/217, 218–219, 223–226, 250
See application file for complete search history.

(56) References Cited

U.S. PATENT DOCUMENTS

| | | | |
|---|---|---|---|
| 8,472,383 B1* | 6/2013 | Banerjea et al. ............... | 370/328 |
| 2006/0068820 A1* | 3/2006 | Sugaya et al. ................. | 455/512 |
| 2010/0165963 A1* | 7/2010 | Chu et al. ....................... | 370/338 |
| 2010/0177756 A1 | 7/2010 | Choi et al. | |
| 2011/0093593 A1* | 4/2011 | Shirakata et al. ............. | 709/225 |
| 2013/0176986 A1 | 7/2013 | Yu et al. | |

FOREIGN PATENT DOCUMENTS

| KR | 1020090010523 A | 1/2009 |
|---|---|---|
| WO | WO 96/38015 A1 | 11/1996 |

* cited by examiner

*Primary Examiner* — Ruolei Zong

(57) ABSTRACT

A data transmission apparatus in a communication system includes a reception unit configured to receive terminal information from a plurality of terminals through a new frequency band for transmitting and receiving data between the plurality of terminals and one AP (access point); a verification unit configured to verify the terminal information, group the terminals into terminal groups by using the terminal information, and verify virtual APs which respectively correspond to the terminal groups, in the AP; and a transmission unit configured to transmit beacon frames in the virtual APs, to the terminals included in the terminal groups, wherein the beacon frames include beacon interval information, beacon duration information, beacon offset information, and terminal group information.

20 Claims, 6 Drawing Sheets

APPARATUS AND METHOD FOR TRANSMITTING/RECEIVING DATA IN COMMUNICATION SYSTEM

CROSS-REFERENCES TO RELATED APPLICATIONS

The present application claims priorities of Korean Patent Application Nos. 10-2011-0106082 and 10-2012-0114843, filed on Oct. 17, 2011, and Oct. 16, 2012, respectively, which are incorporated herein by reference in their entireties.

BACKGROUND OF THE INVENTION

1. Field of the Invention

Exemplary embodiments of the present invention relate to a communication system, and, more particularly, to an apparatus and a method for transmitting and receiving data in a communication system, in which one AP (access point) transmits and receives data to and from a plurality of terminals, that is, stations (STAB), while maintaining a service quality.

2. Description of Related Art

In a current communication system, research for providing various qualities of service (hereinafter, referred to as 'QoS') to users at a high transmission rate has been actively conducted. In a wireless local area network (hereinafter, referred to as 'WLAN') system as an example of such a communication system, research for methods for stably transmitting large data at a high speed through limited resources has been actively conducted. In particular, in a communication system, research for data transmission through wireless channels has been conducted. Recently, methods for the WLAN system to normally transmit and receive large data by effectively using limited wireless channels have been suggested.

Meanwhile, in a current communication system, in order to efficiently transmit larger data, research for a new frequency band which is not used by legacy devices for data transmission and reception in an existing communication system has been conducted. In particular, research for data transmission and reception in such a new frequency band has been conducted.

However, in the current communication system, no concrete method for transmitting and receiving data in a new frequency band which is not used by the legacy devices band has been suggested. In particular, no concrete method for a frame for transmitting and receiving data in a new frequency band and no concrete method for normally transmitting and receiving data to and from a plurality of users have been suggested. In other words, no concrete method for one AP to normally transmit and receive data to and from a plurality of users, for example, terminals, in a new frequency band while maintaining a QoS has been suggested.

As a consequence, in order to stably transmit and receive data at a high speed through a new frequency band in a communication system, for example, a WLAN system, methods for configuring a frame in a new frequency band and normally transmitting and receiving large data to and from a plurality of users, for example, a plurality of terminals, through the frame in the new frequency band while maintaining a QoS are demanded in the art.

SUMMARY OF THE INVENTION

Embodiments of the present invention are directed to an apparatus and a method for transmitting and receiving data in a communication system.

Other embodiments of the present invention are directed to an apparatus and a method for configuring a frame in a new frequency band and stably transmitting and receiving data at a high speed in a communication system.

Other embodiments of the present invention are directed to an apparatus and a method for normally transmitting and receiving large data to and from a plurality of users, that is, a plurality of terminals, in a new frequency band while maintaining a service quality, in a communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a data transmission apparatus in a communication system includes: a reception unit configured to receive terminal information from a plurality of terminals through a new frequency band for transmitting and receiving data between the plurality of terminals and one AP (access point); a verification unit configured to verify the terminal information, group the terminals into terminal groups by using the terminal information, and verify virtual APs which respectively correspond to the terminal groups, in the AP; and a transmission unit configured to transmit beacon frames in the virtual APs, to the terminals included in the terminal groups, wherein the beacon frames include beacon interval information, beacon duration information, beacon offset information, and terminal group information.

In accordance with another embodiment of the present invention, a data transmitting method in a communication system includes: receiving terminal information from a plurality of terminals through a new frequency band for transmitting and receiving data between the plurality of terminals and one AP (access point); verifying the terminal information, grouping the terminals into terminal groups by using the terminal information, and verifying virtual APs which respectively correspond to the terminal groups, in the AP; and transmitting beacon frames in the virtual APs, to the terminals included in the terminal groups, wherein the beacon frames include beacon interval information, beacon duration information, beacon offset information, and terminal group information.

In accordance with another embodiment of the present invention, a data reception apparatus in a communication system includes: a generation unit configured to generate terminal information in a new frequency band for transmitting and receiving data between a plurality of terminals and one AP (access point); a transmission unit configured to transmit the terminal information to the AP; and a reception unit configured to receive beacon frames from a virtual AP of a terminal group corresponding to the terminal information in the AP, wherein respective virtual APs corresponding to terminal groups to which the terminals are grouped are included in the AP, wherein the terminals included in the terminal groups are connected by respectively receiving beacon frames from virtual APs corresponding to their terminal groups among the virtual APs, and wherein the beacon frames include beacon interval information, beacon duration information, beacon offset information, and terminal group information.

In accordance with another embodiment of the present invention, a data receiving method in a communication system includes: generating terminal information in a new frequency band for transmitting and receiving data between a plurality of terminals and one AP (access point); transmitting the terminal information to the AP; and receiving beacon frames from a virtual AP of a terminal group corresponding to the terminal information in the AP, wherein respective virtual APs corresponding to terminal groups to which the terminals are grouped are included in the AP, wherein the terminals included in the terminal groups are connected by respectively receiving beacon frames from virtual APs corresponding to their terminal groups among the virtual APs, and wherein the beacon frames include beacon interval information, beacon duration information, beacon offset information, and terminal group information.

DESCRIPTION OF SPECIFIC EMBODIMENTS

Figure 1:
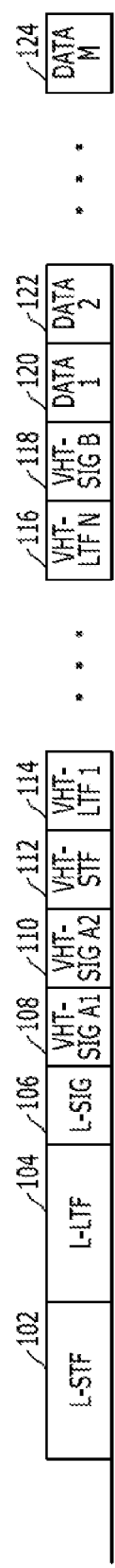
FIGS. 1 to 3 diagrams schematically showing the structures of a frame in a communication system in accordance with embodiments of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention suggests an apparatus and a method for transmitting and receiving data in a communication system, for example, a wireless local area network (hereinafter, referred to as 'WLAN') system. While the WLAN system will be exemplarily described in embodiments of the present invention, the apparatus and the method for transmitting and receiving data suggested in the present invention may be applied to other communication systems.

Also, in an embodiment of the present invention, in a communication system, one AP (access point) normally transmits and receives large data to and from a plurality of terminals, for example, stations, while maintaining a service quality in terms of transmission delay, etc., in a new frequency band which is different from a frequency band used for transmitting and receiving data in an existing system. In an embodiment of the present invention, by controlling an AP to provide a service to a plurality of terminals in a WLAN system, large data are normally transmitted and received to and from the plurality of terminals in a new frequency band, while maintaining various qualities of service (hereinafter, referred to as 'QoS'), and accordingly, it is possible to stably provide services of various QoS to the plurality of terminals, that is, a plurality of users.

A communication system in accordance with an embodiment of the present invention, for example, a WLAN system uses a wireless communication technology for providing a high speed data service in an unlicensed band. In particular, unlike an existing cellular system, only if an access point (hereinafter, referred to as 'AP') serving as a base station is power-connected with a wired network, the communication system may be easily installed even by any one and data communication may be performed at a low cost. The decentralized operation characteristic of such a WLAN system provides an advantage in that a simple operation is possible, and is extended up to a sensor network and a smart utility network. In this regard, while respective terminals do not transmit a large amount of data in an application such as the sensor network or the smart utility network, a service quality in terms of transmission delay, etc. is considered important and it is important for one AP to support a large number of terminals.

Therefore, in a communication system in accordance with an embodiment of the present invention, in order to allow one AP to normally transmit and receive large data to and from a plurality of terminals through a new frequency band while maintaining a QoS, one physical AP operates as a plurality of APs, that is, one physical AP includes a plurality of virtual APs and performs the functions of a plurality of APs, thereby overcoming the disadvantages of the CSMA (carrier sense multiple access) scheme as a competitive scheme. The virtual APs included in one physical AP perform the same function as the AP, in particular, performs the function of administrating terminal groups for a plurality of terminals.

Also, in the CSMA scheme, in the case where a number of terminals are to transmit data at a certain time, as the terminals compete with one another to transmit data, it is difficult to meet a requirement for transmission delay, and at the worst, collision occurs among the data newly transmitted by the respective terminals and no terminals may transmit data. In other words, since the CSMA scheme has a decentralized operation characteristic in that the role of controlling connection of terminals is not centrally performed, the terminals compete with one another to transmit data and a terminal which wins the competition transmits data, a limit exists in the number of terminals capable of being actually supported by one AP.

However, in a WLAN system which mainly uses a sensor network or a VoIP (voice over Internet protocol), while an amount of data to transmit is not substantial, a quality of service in terms of transmission delay should be satisfied, and simultaneous connection of a number of terminals should be possible. Accordingly, in an embodiment of the present invention, in order to satisfy the quality of service and effectively support a number of terminals in the WLAN system as described above, an AP control scheme and a terminal connection scheme are suggested. In the case where a number of terminals are simultaneously connected to one AP and compete with one another to transmit data in the WLAN system, the probability of packets to collide in a wireless environment increases by the number of the terminals and a channel utilization efficiency markedly deteriorates, and in an extreme case, a situation may result in which packet collision continuously occurs and no terminals transmit data. In consideration of this fact, in the embodiment of the present invention, by applying TDMA (time division multiple access) to the CSMA scheme, even in the case where a plurality of terminals are to be simultaneously connected, connection of an AP and terminals is controlled so that the AP can transmit and receive data to and from the terminals.

In such a communication system in accordance with the embodiment of the present invention, wireless transmission in the new frequency band means wireless transmission in a frequency band which is different from the 2.4 GHz or 5 GHz band used in the existing WLAN system. Therefore, in the case where the frame structure of the IEEE 802.11ac system is used as it is in the embodiment of the present invention in which wireless transmission is implemented in the new frequency band, data processing rate is likely to deteriorate due to a substantial unnecessary overhead. For example, in the IEEE 802.11ac system, in order to maintain compatibility with the IEEE 802.11a system and the IEEE 802.11n system which are already defined in the same 5 GHz band, additional signals and information are included. However, in the case where the frame structure of the IEEE 802.11ac system is used in the new frequency band in accordance with the embodiment of the present invention, configuration of an efficient frame is possible because additional signals and information are not needed for such compatibility. Further, in the case where a new transmission scheme and a new data transmission rate are defined, bit allocation of control information may be changed.

In the frame structure of the above-described IEEE 802.11ac system, after a legacy short training field (L-STF), a legacy long training field (L-LTF) and a legacy signal field (L-SIG) are first defined in order for compatibility with the IEEE 802.11a system and the IEEE 802.11n system which use the same 5 GHz band, a very high throughput signal field (VHT-SIG) in which the control information of a frame actually used in the IEEE 802.11ac system is included, a very high throughput short training field (VHT-STF) for automatic gain control, a very high throughput long training field (VHT-LTF) for channel estimation, and a data field in which data to be actually transmitted are included, are defined.

The L-STF, L-LTF and L-SIG are fields which are defined for compatibility with the IEEE 802.11a system and the IEEE 802.11n system. Thus, in a system which does not use the 5 GHz band, the fields for the compatibility, that is, the L-STF, L-LTF and L-SIG, serve as unnecessary overheads. Hence, in the embodiment of the present invention, a novel frame structure, which reduces an overhead and includes new control information needed in a new system using a new frequency band, is configured.

The IEEE 802.11ac system enables data transmission of a G bps level while maintaining compatibility with the IEEE 802.11a system and the IEEE 802.11n system in the 5 GHz band. In particular, the IEEE 802.11ac system supports bandwidths of 20 MHz, 40 MHz, 80 MHz and 160 MHz, and transmits maximum 8 data streams using a multiple transmission and reception antenna technology, wherein data are transmitted by configuring a frame to maintain compatibility with other systems as described above. Hereinbelow, a frame structure in a communication system in accordance with an embodiment of the present invention will be described in detail with reference to FIGS. 1 to 3.

FIG. 1 is a diagram schematically showing a frame structure in a communication system in accordance with an embodiment of the present invention. FIG. 1 is a diagram schematically showing the frame structure of the IEEE 802.11ac system in the communication system in accordance with the embodiment of the present invention.

Referring to FIG. 1, a frame of the IEEE 802.11ac system includes control fields in which control information for data transmission to and from a plurality of terminals is included, that is, an L-STF 102, an L-LTF 104, an L-SIG 106, a VHT-SIG A1 108, a VHT-SIG A2 110, a VHT-STF 112, a plurality of VHT-LTFs, for example, a VHT-LTF 1 114 and a VHT-LTF N 116, and a VHT-SIG B 118, and includes a plurality of data fields as data fields in which data to be transmitted to the plurality of terminals are included, that is, a DATA 1 120, a DATA 2 122 and a DATA M 124.

The L-STF 102 is used in signal detection, automatic gain control, frequency error estimation, frame synchronization, and so forth, and the L-LTF 104 is used in channel estimation, frequency error estimation, and so forth. Also, the L-SIG 106 includes transmission rate information, frame length information, and so forth, and the VHT-SIG A1 108 and the VHT-SIG A2 110 include information such as band widths, guard interval lengths, space-time codes, transmission rates (MCS (modulation and coding scheme) levels), data stream numbers, AID information, a used coding technology, beamforming, and so forth.

The VHT-STF 112 is used in automatic gain control, and the VHT-LTF 1 114 and the VHT-LTF N 116 are used in channel estimation. The VHT-SIG B 118 includes transmission rates (MCS levels) by user, for multi-user MIMO (multi-input multi-output), data length information, and so forth, and the DATA 1 120, the DATA 2 122 and the DATA M 124 include data which are to be actually transmitted to users, that is, STAB (stations) as terminals.

The VHT-LTF 1 114 and the VHT-LTF N 116 are determined according to the number of data streams which are to be transmitted through the frame. For example, in the case where only one stream is transmitted, only the VHT-LTF 1 114, that is, one VHT-LTF is included in the frame, and, in the case where the number of streams is 2, the VHT-LTF 1 114 and a VHT-LTF 2, that is, two VHT-LTFs are included in the frame.

The transmission rate information and frame length information of the L-SIG 106 do not actually include the information of data, and causes data transmission not to be implemented during the length of a received frame in the case where the terminals of the IEEE 802.11a system or the IEEE 802.11n system receive the corresponding frame. The transmission rate information and frame length information of the L-SIG 106 become unnecessary information in the case where compatibility with the IEEE 802.11a system or the IEEE 802.11n system is not considered. The functions of the L-STF 102 and the L-LTF 104 may be replaced by the VHT-STF 112 and the VHT-LTFs 114 and 116. In the case where compatibility is not considered as described above, the frame structure of the IEEE 802.11ac system becomes an inefficient frame structure due to the presence of an overhead. A frame structure newly configured by removing such inefficiency will be described in detail with reference to FIG. 2.

Figure 2:

FIG. 2 is a diagram schematically showing a frame structure in a communication system in accordance with another embodiment of the present invention. FIG. 2 is a diagram showing a frame structure in which compatibility with the IEEE 802.11a system or the IEEE 802.11n system is not considered and an overhead is reduced from the frame structure of the IEEE 802.11ac system shown in FIG. 1, to improve efficiency. Also, FIG. 2 is a diagram showing a new frame structure in a new frequency band in a communication system in accordance with another embodiment of the present invention, which is different from a frequency band used for transmitting and receiving data in an existing system.

Referring to FIG. 2, a frame in the new frequency band includes control fields in which control information for data transmission to and from a plurality of terminals is included, that is, a VHT-STF 202, a VHT-SIG A1 206, a VHT-SIG A2 208, a plurality of VHT-LTFs, for example, a VHT-LTF 1 204, a VHT-LTF 2 210 and a VHT-LTF N 212, and a VHT-SIG B 214, and includes a plurality of data fields as data fields in which data to be transmitted to the plurality of terminals are included, that is, a DATA 1 216, a DATA 2 218 and a DATA M 220.

The VHT-STF 202 is used in signal detection, automatic gain control, frequency error estimation, frame synchronization, and so forth, and the VHT-LTF 1 204 is used in channel estimation, frequency error estimation, and so forth. Also, the VHT-SIG A1 206 and the VHT-SIG A2 208 include information such as band widths, guard interval lengths, space-time codes, transmission rates (MCS levels), data stream numbers, AID information, a used coding technology, beamforming, application of a new transmission mode, and so forth.

described frame of the IEEE 802.11ac system, and performs the function performed by the L-STF 102. Among the VHT-LTFs 204, 210 and 212, the VHT-LTF 1 204 as a first long training field is preferentially arranged at the front portion of the frame, that is, next to the VHT-STF 202, and the remaining N−1 number of VHT-LTFs 210 and 212 are arranged after the VHT-SIG A1 206 and the VHT-SIG A2 208. Control information for the frame which all terminals should receive is included in the VHT-SIG A1 206 and the VHT-SIG A2 208.

In the case where the communication system, which transmits and receives data using such frame in the new frequency band, supports a multi-user MIMO function, the VHT-SIG B 214, which includes the transmission rate information by user and the data length information, should be included in the frame structure in the new frequency band. In the case where the communication system does not support the multi-user MIMO function, the VHT-SIG B 214 may be omitted from the frame.

The structures of the VHT-SIG A1 206 and the VHT-SIG A2 208 are as given in Table 1.

TABLE 1

| | | | | |
|---|---|---|---|---|
| VHT-SIG A1 | B0-B1 | Bandwidth | 2-bit | Denoting 20/40/80/160 MHz by 0/1/2/3, respectively. |
| | B3 | Reservation | 1-bit | Fixing to 1 |
| | B4-B9 | Group ID | 6-bit | Including group ID information |
| | B10-21 | Nsts | 12-bit | In the case of a multi-user, denoting the numbers of streams of 4 users to 0 to 4, by 3 bits for each user. In the case of a single user, denoting 1(000) to 8(111) streams by B10 to B12, B13 to B21 including partial AID information |
| | B22 | TXOP_PS_NOT_ALLOWED | 1-bit | Indicating whether TXOP_PS can be utilized or not |
| | B23 | Reservation | 1-bit | Fixing to 1 |
| VHT-SIG A2 | B0-B1 | Short GI | 2-bit | Setting according to whether short GI is used or not |
| | B2-B3 | Coding scheme (coding) | 2-bit | Indicating whether LDPC and BCC are used or not |
| | B4-B7 | Transmission rate (MCS) | 4-bit | Defining 10 MCSs from BPSK 1/2 code rate to 256-QAM 5/6 code rate |
| | B8 | Beamforming | 1-bit | Indicating whether beamforming is used or not |
| | B9 | Reservation | 1-bit | Fixing to 1 |
| | B10-B17 | CRC | 8-bit | Inserting CRC bit |
| | B18-B23 | Tail | 6-bit | For tailing trellis of Viterbi decoder |

Not only the VHT-LTF 1 204 but also the VHT-LTF 2 210 and the VHT-LTF N 212 are used in channel estimation, and the VHT-SIG B 214 includes transmission rates (MCS levels) by user, for multi-user MIMO, data length information, and so forth. The DATA 1 216, the DATA 2 218 and the DATA M 220 include data which are to be actually transmitted to users, that is, STAB as terminals.

In the communication system in accordance with the embodiment of the present invention, in order to transmit data using the frame in the new frequency band, the VHT-STF 202 is extended by the length of the L-STF 102 in the above- In Table 1, in the case where the number of possible bandwidths (BWs) of the communication system in accordance with the embodiment of the present invention as shown in FIG. 2, which uses the frame structure in the new frequency band, is at least 4, the region B3 of the VHT-SIG A1 206 may be additionally utilized for bandwidth information in consideration of the cases where a bandwidth is equal to or larger than 20 MHz, 40 MHz, 80 MHz and 160 MHz, for example. In the case of Nsts which denotes the number of space-time transmission streams in the VHT-SIG A1 206, maximum 4 streams are allocated to 4 users for a multi-user, and, in the case of a single user, maximum 8 streams may be allocated. In the communication system in accordance with the embodiment of the present invention as shown in FIG. 2, which uses the frame structure in the new frequency band, as can be readily seen from above descriptions, each of the numbers of streams to be allocated is decreased to a half to secure a margin of 1 bit, and the 1 bit secured in this way may be allocated to a new transmission scheme.

That is to say, in the communication system in accordance with the embodiment of the present invention as shown in FIG. 2, which uses the frame structure in the new frequency band, a transmission rate is decreased to a half through repetitive transmission and the like when compared to a conventional system, and 1 bit may be allocated to define a mode capable of increasing a communication distance.

Therefore, in the communication system in accordance with the embodiment of the present invention, 3 bits are allocated to each user in the case of a multi-user, wherein 1 bit of the 3 bits is allocated as a bit for indicating whether or not to perform repetitive transmission, and the remaining 2 bits denote the number of transmission streams. Furthermore, in the communication system in accordance with the embodiment of the present invention, even in the case of a single user, 1 bit is used to indicate whether or not to perform repetitive transmission, the remaining 2 bits define 1 to 4 transmission streams, and, in the case where an additional transmission mode is further needed, the additional transmission mode may be used by using other reserved bits.

For example, in the communication system in accordance with the embodiment of the present invention, in the case where up to a 4× repetitive transmission mode or a 6× repetitive transmission mode is defined to further extend a communication distance, up to the region B23 of the VHT-SIG A1 206 or the region B9 of the VHT-SIG A2 208 is utilized in defining a new mode. Moreover, in the communication system in accordance with the embodiment of the present invention, in the case where a mode for extending a communication distance by increasing a reception sensitivity as in repetitive transmission is used, the VHT-STF 202 and the VHT-LTFs 204, 210 and 212 are used by being extended in the lengths thereof to improve performance of initial signal detection and channel estimation. The extended VHT-LTFs 204, 210 and 212 have the same structure as an existing OFDM (orthogonal frequency division multiplexing) symbol. In the case where the VHT-LTFs 204, 210 and 212 are not extended, they have the structure of DGI (double GI (guard interval))+LTF+LTF as in the L-LTF 104, and, in the case where the VHT-LTFs 204, 210 and 212 are extended, extension is made by increasing the number of the structures of GI+LTF which are added next to the structure of DGI+LTF+LTF.

For the sake of convenience in explanation, it is assumed that, in the basic structures of the VHT-SIG A1 206 and the VHT-SIG A2 208, 52 data subcarriers, which remain by excluding guard band, DC (direct current) and pilot subcarriers from total 64 subcarriers, are used as BPSK (binary phase shift keying) 1/2 coding rate channel codes. According to this fact, in the communication system in accordance with the embodiment of the present invention, while 26 bits may be allocated to each OFDM symbol, only 24 bits may be allocated to each OFDM symbol by using only 48 data subcarriers as in the L-SIG 106 of the IEEE 802.11ac system.

For example, in the communication system in accordance with the embodiment of the present invention, as in the IEEE 802.11ac system, a W Hz bandwidth mode using 64 subcarriers, a 2 W Hz bandwidth mode using 128 subcarriers, a 4 W Hz bandwidth mode using 256 subcarriers and an 8 W Hz bandwidth mode using 512 subcarriers are basically present, and a W/2 Hz bandwidth mode using 32 subcarriers is additionally present. In this regard, while W=20 MHz is defined in the IEEE 802.11ac system, in the communication system in accordance with the embodiment of the present invention, a bandwidth is used by being changed so as to use a new frequency band different from that of the IEEE 802.11ac system. The bandwidth in the new frequency band is defined as W Hz.

In other words, in the communication system in accordance with the embodiment of the present invention, the VHT-SIG A1 206 and the VHT-SIG A2 208 for the W/2 bandwidth mode and the VHT-SIG A1 206 and the VHT-SIG A2 208 for the W Hz, 2 W Hz, 4 W Hz and 16 W Hz bandwidth modes are separately defined. In the communication system in accordance with the embodiment of the present invention, since the W Hz, 2 W Hz, 4 W Hz and 16 W Hz bandwidth modes are defined by defining the W Hz bandwidth mode using 64 subcarriers and then extending the W Hz bandwidth mode, the total numbers of the bits included in the VHT-SIG A1 206 and the VHT-SIG A2 208 are the same with each other. Therefore, in the communication system in accordance with the embodiment of the present invention, in the case of allocating two OFDM symbols to the VHT-SIG A1 206 and the VHT-SIG A2 208, total 52 bits or 48 bits are used to allocate control information.

Figure 4:
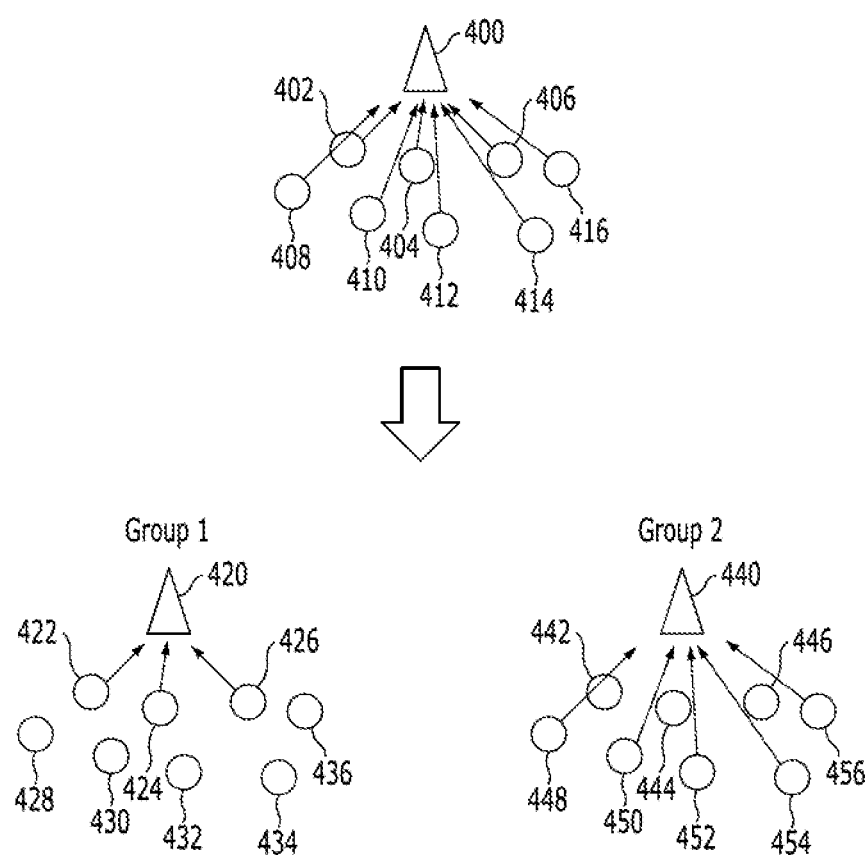
FIG. 4 is a diagram schematically showing the structure of a communication system in accordance with an embodiment of the present invention.

Also, in the communication system in accordance with the embodiment of the present invention, because subcarriers capable of being used in the W/2 Hz bandwidth mode are decreased to ½, the number of bits capable of being allocated to each OFDM symbol is limited. Namely, in the communication system in accordance with the embodiment of the present invention, as shown in FIG. 4, subcarriers are allocated according to the W Hz bandwidth mode using 64 subcarriers and the W/2 Hz bandwidth mode using 32 subcarriers. Since FIG. 4 will be described later in detail, concrete descriptions thereof will be omitted herein.

That is to say, in the communication system in accordance with the embodiment of the present invention, since a difference in the numbers of information bits capable of being allocated to the VHT-SIG A1 206 and the VHT-SIG A2 208 according to bandwidths is substantial, the OFDM symbol numbers and bit allocation schemes of the VHT-SIG A1 206 and the VHT-SIG A2 208 are made different according to bandwidths.

In detail, first, in the case of the W Hz bandwidth mode, in the communication system in accordance with the embodiment of the present invention, when assuming that two OFDM symbols are used as the VHT-SIG A1 206 and the VHT-SIG A2 208, bit allocation for the 48 bits or 52 bits of the VHT-SIG A1 206 and the VHT-SIG A2 208, that is, the information included in the VHT-SIG A1 206 and the VHT-SIG A2 208, is as follows.

- MCS (modulation and coding scheme): 4 bits are needed (maximum 16 cases including 10 cases of the IEEE 802.11ac system and new MCSs, in which repetitive transmission is applied to a lowest transmission rate, are denoted).
- Length (packet length): At least 10 bits are needed as the length is denoted by the unit of byte (denoted in a 2 byte or 4 byte type) or by the unit of OFDM symbol (an additional bit for solving the ambiguity of the last OFDM symbol is included). Here, 12 bits are needed in the case of the IEEE 802.11a system, 16 bits are needed in the case of the IEEE 802.11n system, and 17 bits are needed in the case of the IEEE 802.11ac system.

Guard interval (guard interval length): 2, 3 or 4 types are included in a regular GI type, a short GI type, and, as the occasion demands, a shorter GI type, and 1 bit or 2 bits are needed.

BW (bandwidth): 2 bits for denoting the W Hz, 2 W Hz, 4 W Hz and 8 W Hz bandwidth modes and 1 bit for denoting the W/2 Hz bandwidth mode are added. In the case of the W/2 Hz bandwidth mode, 1 bit may not be included in BW information for automatic detection using a preamble. 2 to 3 bits are needed.

STBC (space-time block code): 1 bit is needed to indicate whether STBCs are utilized or not.

Tail: 6 bits of 0 are inserted last.

Nsts (number of space-time streams): Maximum 4 as the number of data streams to be simultaneously transmitted using MIMO may be denoted, and 2 bits are needed.

Coding scheme: 1 bit is needed to select a convolution code and a low density parity check (LDPC) code.

TXOP-PS (power save using TXOP (transmission opportunity)): 1 bit is needed to denote selection according to whether TXOP-PS is utilized or not.

CRC: 8 bits are needed to perform CRC (cyclic redundancy check) for the VHT-SIG A1 206 and the VHT-SIG A2 208 (the number of bits may be changed through change of the coding rate of the CRC).

Reserved (reserved bit): Bits left after allocation are denoted by preset numbers at preset locations.

Further, in the communication system in accordance with the embodiment of the present invention, the contents used in the IEEE 802.11 system may be changed and other contents may be added. The following information is additionally included. That is to say, the information additionally included in the VHT-SIG A1 206 and the VHT-SIG A2 208 is as follows.

Application field and QoS (quality of service) requirements.

Aggregation.

Battery power warning.

Power level.

PSMP (power save multi-poll) group.

Warning signals.

A number of parameters associated with STA connection.

In other words, in the communication system in accordance with the embodiment of the present invention, the VHT-SIG A1 206 and the VHT-SIG A2 208 constituted by 48 bits or 52 bits by combining bits as described above are transmitted during 2 OFDM symbols.

Moreover, in the W/2 Hz bandwidth mode, since total 24 bit allocation is possible in the case where only 2 OFDM symbols are allocated to the VHT-SIG A1 206 and the VHT-SIG A2 208, in the communication system in accordance with the embodiment of the present invention, only essential information is allocated as follows. That is to say, the essential information included in the VHT-SIG A1 206 and the VHT-SIG A2 208 is as follows.

MCS: 4 bits.
Length: 12 bits.
Tail: 6 bits.
Parity: 1 bit (error check is performed using parity, instead of CRC)
W/2 Hz BW (or GI): 1 bit. 1 bit may be allocated to identify the W/2 Hz bandwidth mode. Since automatic detection may be implemented using a preamble structure, a guard interval length is denoted instead.

In this way, in the communication system in accordance with the embodiment of the present invention, since only the essential information of 24 bits is allocated to the VHT-SIG A1 206 and the VHT-SIG A2 208, the number of OFDM symbols is increased to 3 or 4 in the case where information is additionally needed, so that the needed information is additionally allocated as in the W Hz bandwidth mode. Further, in the communication system in accordance with the embodiment of the present invention, in the case of the W/2 Hz bandwidth mode, the lengths of the VHT-SIG A1 206 and the VHT-SIG A2 208 may be made different from packet to packet, such that the amounts of the information included in the VHT-SIG A1 206 and the VHT-SIG A2 208 are made different from each other. In this regard, in order for a reception apparatus to verify the differences in the lengths of the VHT-SIG A1 206 and the VHT-SIG A2 208 and verify the extension of the VHT-LTFs 204, 210 and 212 in the case of using repetitive transmission, the VHT-SIG A1 206 and the VHT-SIG A2 208 are modified by combining Q-BPSK and BPSK and are then transmitted. According to this fact, the reception apparatus first discriminates the W/2 Hz bandwidth mode and the W Hz, 2 W Hz, 4 W Hz and 8 W Hz bandwidth modes from each other, verifies the VHT-SIG A1 206 and the VHT-SIG A2 208 in such a way as to correspond to such discrimination, detects the numbers of OFDM symbols used in the VHT-SIG A1 206 and the VHT-SIG A2 208 even in case of the W/2 Hz bandwidth mode, and extracts the information included in the VHT-SIG A1 206 and the VHT-SIG A2 208. Hereinbelow, a new frame structure in which a repetitive transmission scheme is considered in a communication system in accordance with an embodiment of the present invention will be described in detail with reference to FIG. 3.

Figure 3:

FIG. 3 is a diagram schematically showing a frame structure in a communication system in accordance with still another embodiment of the present invention. FIG. 3 is a diagram showing a new frame structure in which a repetitive transmission scheme is considered in the new frame structure for the new frequency band, shown in FIG. 2. Also, FIG. 3 is a diagram showing a new frame structure in which each of a VHT-SIG A1 and a VHT-SIG A2 includes 2 OFDM symbols and a 2× repetitive transmission scheme is exemplified.

Referring to FIG. 3, a frame in the new frequency band includes control fields in which control information for data transmission to and from a plurality of terminals is included, that is, a VHT-STF 302, two VHT-SIG A1s 306 and 308, two VHT-SIG A2s 310 and 312, a plurality of VHT-LTFs, that is, a VHT-LTF 1 304, a VHT-LTF 2 314 and a VHT-LTF N 316, and two VHT-SIG Bs 318 and 320 according to repetitive transmission, and includes a plurality of data fields as data fields in which data to be transmitted to the plurality of terminals are included, that is, two DATA is 322 and 324 and two DATA Ms 326 and 328.

The VHT-STF 302 is used in signal detection, automatic gain control, frequency error estimation, frame synchronization, and so forth, and the VHT-LTF 1 304 is used in channel estimation, frequency error estimation, and so forth. Also, the VHT-SIG A1s 306 and 308 and the VHT-SIG A2s 310 and 312 include information such as band widths, guard interval lengths, space-time codes, transmission rates (MCS levels), data stream numbers, AID information, a used coding technology, beamforming, and so forth.

Not only the VHT-LTF 1 304 but also the VHT-LTF 2 314 and the VHT-LTF N 316 are used in channel estimation, and the VHT-SIG Bs 318 and 320 include transmission rates (MCS levels) by user, for multi-user MIMO, data length information, and so forth. The DATA is 322 and 324 and the DATA Ms 326 and 328 include data which are to be actually transmitted to users, that is, STAB as terminals.

In the communication system in accordance with the embodiment of the present invention, in the case where a repetitive transmission scheme is considered, that is, a repetitive transmission mode is used, in the frame structure in the new frequency band shown in FIG. 2, not only a VHT-SIG A1 and a VHT-SIG A2 but also a VHT-SIG B repeat their respective previous symbols, that is, are consecutively repeated as in the frame structure shown in FIG. 3 and thus the two VHT-SIG A1s 306 and 308, the two VHT-SIG A2s 310 and 312 and the two VHT-SIG Bs 318 and 320 are included in the frame, and also, the data fields repeat their respective previous symbols, that is, are consecutively repeated and thus the two DATA is 322 and 324 and the two DATA Ms 326 and 328 are included in the frame. The consecutively repeated VHT-SIG A1s 306 and 308, VHT-SIG A2s 310 and 312, VHT-SIG Bs 318 and 320, DATA is 322 and 324 and DATA Ms 326 and 328 have the types of symbols which repeat their respective previous symbols, and are included in the frame through a variety of repetition schemes such as simple symbol repetition or repetition by changing the positions of subcarriers.

In the communication system in accordance with the embodiment of the present invention which uses the frame structure shown in FIG. 3, as reception sensitivity is improved, the length of the VHT-STF 302 is extended and thus signal detection performance in the reception apparatus is improved, and the lengths of the VHT-LTF2 314 and the VHT-LTF N 316 are extended as well. Namely, as aforementioned above with reference to FIG. 2, the VHT-STF 302 is extended by the length of the L-STF 102 in the above-described frame of the IEEE 802.11ac system, and performs the function performed by the L-STF 102. Among the VHT-LTFs 304, 314 and 316, the VHT-LTF 1 304 as a first long training field is preferentially arranged at the front portion of the frame, that is, next to the VHT-STF 302, and the remaining N−1 number of VHT-LTFs 314 and 316 are arranged after the VHT-SIG A1s 306 and 308 and the VHT-SIG A2s 310 and 312. Hereinbelow, the structure of a communication system in accordance with an embodiment of the present invention will be described in detail with reference to FIG. 4.

FIG. 4 is a diagram schematically showing the structure of a communication system in accordance with an embodiment of the present invention.

Referring to FIG. 4, in the case where a plurality of terminals 402, 404, 406, 408, 410, 412, 414 and 416 are to be simultaneously connected to one AP 400 through an available frequency band, for example, a new frequency band which is different from a frequency band used by legacy devices in an existing system, a communication system groups the plurality of terminals 402, 404, 406, 408, 410, 412, 414 and 416 into a predetermined number of terminal groups, for example, a first terminal group Group 1 and a second terminal group Group 2, to ensure that the plurality of terminals 402, 404, 406, 408, 410, 412, 414 and 416 are simultaneously connected to the one AP 400 and normally transmit and receive data through the available frequency band, for example, the new frequency band. Further, the communication system causes the two terminal groups to alternately have a permission for channel use and causes only the terminals belonging to a corresponding group to be connected to the one AP 400 in the CDMA scheme during a time in which the corresponding group has the permission for channel use.

APs corresponding to the terminal groups of the plurality of terminals 402, 404, 406, 408, 410, 412, 414 and 416 are configured. Namely, a first virtual AP 420, which performs the function of an AP corresponding to the first terminal group of the terminal groups, and a second virtual AP 440, which performs the function of an AP corresponding to the second terminal group of the terminal groups, are configured in the one AP 400. That is to say, the first virtual AP 420 corresponding to the first terminal group and the second virtual AP 440 corresponding to the second terminal group are included in the one AP 400. As aforementioned above, the virtual APs 420 and 440 are included in the one physical AP 400, and perform the same function as the one physical AP 400, in particular, the functions of administrating the terminal groups of the plurality of terminals 402, 404, 406, 408, 410, 412, 414 and 416. In other words, the virtual APs 420 and 440 mean APs which perform the functions of administrating the terminal groups.

The first virtual AP 420 and the second virtual AP 440, which are included in the one AP 400, use the available frequency band capable of being used by the one AP 400, that is, a channel allocated to the one AP 400, in such a way as to divide the channel in a time division scheme. Namely, by dividing the channel allocated to the one AP 400 in the time division scheme, the terminals included in the first terminal group are connected to the first virtual AP 420 and transmit and receive data during a first time interval, and the terminals included in the second terminal group are connected to the second virtual AP 440 and transmit and receive data during a second time interval.

In detail, first, when the plurality of terminals 402, 404, 406, 408, 410, 412, 414 and 416 are connected to the one AP 400, the one AP 400 identifies terminal information of the plurality of terminals 402, 404, 406, 408, 410, 412, 414 and 416, determines the number of the terminal groups of the entire terminals, and informs terminal group information for the terminal groups to which the respective terminals are included, for example, virtual AP information of the virtual APs 420 and 440 which correspond to the respective terminal groups, to the plurality of terminals 402, 404, 406, 408, 410, 412, 414 and 416.

In order to allow the one AP 400 to determine the number of the terminal groups and group the plurality of terminals 402, 404, 406, 408, 410, 412, 414 and 416 into the terminal groups, that is, allocate the plurality of terminals 402, 404, 406, 408, 410, 412, 414 and 416 to corresponding terminal groups, the plurality of terminals 402, 404, 406, 408, 410, 412, 414 and 416 respectively transmit information for average amounts of data to be transmitted by themselves, service qualities in terms of maximally acceptable transmission delay, etc., that is, terminal information, to the AP 400 when they are initially connected to the one AP 400. The AP 400 determines the terminal groups of the plurality of terminals 402, 404, 406, 408, 410, 412, 414 and 416 and performs grouping, by using the terminal information respectively received from the plurality of terminals 402, 404, 406, 408, 410, 412, 414 and 416.

Also, in the case of a sensor network or a smart utility network, sensor terminals or smart metering terminals transmit their terminal information to the AP 400 with a specified period. That is to say, the sensor terminals or the smart metering terminals transmit their data transmission periods and QoS parameters such as acceptable transmission delay ranges or importance of data, that is, priorities, to the AP 400 as the terminal information. The AP 400 groups the terminals into the terminal groups on the basis of the terminal information respectively received from the terminals, and determines and transmits the parameters of the terminal groups, that is, terminal group information.

For example, the AP 400 having respectively received the terminal information from the plurality of terminals 402, 404, 406, 408, 410, 412, 414 and 416 as described above sets terminals with similar transmission periods into the same terminal groups or controls a channel occupation authority, such as a channel occupation period or a channel occupation time, which is allocated to a corresponding terminal group, in consideration of transmission delay. Further, the AP 400 may maintain the same QoS of the terminals included in one terminal group, in such a way as to decrease the number of total terminals in the terminal group of a corresponding terminal, in the case where data importance is high.

That is to say, in the communication system in accordance with the embodiment of the present invention, the plurality of terminals 402, 404, 406, 408, 410, 412, 414 and 416 respectively transmit their terminal information, for example, QoS parameters, to the AP 400, and the AP 400 groups the plurality of terminals 402, 404, 406, 408, 410, 412, 414 and 416 into a plurality of terminal groups by using the terminal information respectively received from the plurality of terminals 402, 404, 406, 408, 410, 412, 414 and 416. The plurality of terminals 402, 404, 406, 408, 410, 412, 414 and 416 transmit the QoS parameters, that is, the terminal information, to the AP 400 by including the QoS parameters, that is, the terminal information, in connection request control packets, when being initially connected to the AP 400. In the case where the QoS parameters, that is, the terminal information is changed, the plurality of terminals 402, 404, 406, 408, 410, 412, 414 and 416 inform changed information of the QoS parameters, that is, the terminal information, to the AP 400 during signal transmission and reception intervals after initial connection. In order to transmit the changed information of the QoS parameters, that is, the terminal information, control fields are added to data packets such that the changed information of the QoS parameters can be transmitted.

In this way, in the communication system in accordance with the embodiment of the present invention, the one AP 400 receives the terminal information from the plurality of respective terminals 402, 404, 406, 408, 410, 412, 414 and 416, groups the plurality of terminals 402, 404, 406, 408, 410, 412, 414 and 416 into the first terminal group and the second terminal group, and configures the first virtual AP 420 corresponding to the first terminal group and the second virtual AP 440 corresponding to the second terminal group in itself, that is, includes the first virtual AP 420 and the second virtual AP 440 in the AP 400 itself. As described above, the first virtual AP 420 and the second virtual AP 440 are virtual APs which perform the functions of APs in the one physical AP 400, and the terminals included in the terminal groups of the first virtual AP 420 and the second virtual AP 440 are respectively connected to the channel of the AP 400 through time division.

For example, terminals 422, 424 and 426 included in the first terminal group are connected to the first virtual AP 420 during a first time interval in the channel of the AP 400 and transmit and receive data, and terminals 448, 450, 452, 454 and 456 included in the second terminal group are connected to the second virtual AP 440 during a second time interval in the channel of the AP 400 and transmit and receive data. Also, terminals 428, 430, 432, 434 and 436 included in the first terminal group are not connected to the first virtual AP 420 during the first time interval, and terminals 442, 444 and 446 included in the second terminal group are not connected to the second virtual AP 440 during the second time interval.

In the communication system in accordance with the embodiment of the present invention, as described above, in order to ensure that a plurality of terminals are connected to one AP and normally transmit and receive large data through a new frequency band, the plurality of terminals are grouped into terminal groups by using terminal information received from the respective terminals, and virtual APs respectively corresponding to the terminal groups are configured in the one AP. In this regard, in the communication system in accordance with the embodiment of the present invention, kinds of beacon frames are classified such that allocation information for the respective terminal groups can be acquired from the respective kinds of beacon frames. For example, in the case where 3 terminal groups exist, one physical AP is constituted by 3 virtual APs, and beacon frames are classified into 3 kinds according to the 3 virtual APs. Due to this fact, one physical AP transmits 3 kinds of beacon frames, that is, the 3 virtual APs respectively transmit beacon frames corresponding to them, and terminals included in the terminal groups corresponding to the 3 virtual APs respectively receive corresponding beacon frames, set their terminal groups and use wireless channels according to the set terminal groups. Hereinbelow, transmission and reception of beacon frames in a communication system in accordance with an embodiment of the present invention will be described in detail with reference to FIGS. 5 and 6.

Figure 5:
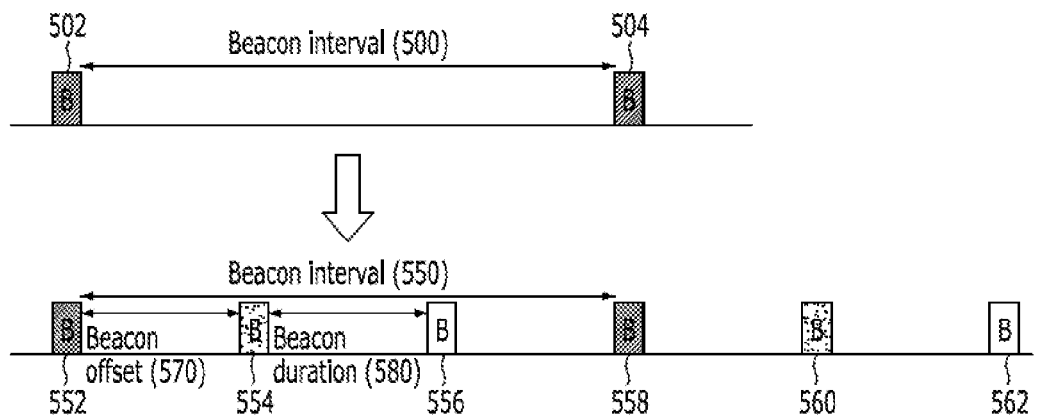
FIGS. 5 and 6 are diagrams schematically showing transmission and reception of beacon frames in a communication system in accordance with embodiments of the present invention.

FIG. 5 is a diagram schematically showing transmission and reception of beacon frames in a communication system in accordance with an embodiment of the present invention.

Referring to FIG. 5, in a communication system, for example, a WLAN system, one physical AP transmits beacon frames 502 and 504 for the purpose of broadcasting the information of the AP. The beacon frames 502 and 504 are periodically transmitted with a predetermined beacon interval 500.

For example, to be described in detail, in the communication system, in the case where a beacon interval 500 of reference beacon frames 502 and 504 transmitted by one physical AP is 100 ms, when a plurality of terminals which are to be connected to the one physical AP are grouped into 3 terminal groups by using the terminal information received from the plurality of terminals as described above, 3 virtual APs respectively corresponding to the 3 terminal groups, that is, a first virtual AP corresponding to a first terminal group, a second virtual AP corresponding to a second terminal group and a third virtual AP corresponding to a third terminal group are configured in the one physical AP. In order to configure such 3 virtual APs, in the communication system, 2 additional beacon frames are transmitted during the beacon interval 500 of the reference beacon frames 502 and 504 which are transmitted by the one physical AP.

That is to say, in the communication system, the first virtual AP transmits first beacon frames 552 and 558 to the first terminal group, the second virtual AP transmits second beacon frames 554 and 560 to the second terminal group, and the third virtual AP transmits third beacon frames 556 and 562 to the third terminal group. The first beacon frames 552 and 558, the second beacon frames 554 and 560 and the third beacon frames 556 and 562 have a beacon interval 550 that is the same as the beacon interval 500 of the reference beacon frames 502 and 504, for example, of 100 ms.

In the communication system, the second beacon frames 554 and 560 and the third beacon frames 556 and 562 may be configured shorter than the first beacon frames 552 and 558 which perform the functions of existing beacon frames, to improve the efficiency of a network. In other words, the first beacon frames 552 and 558 include information for the AP such as an SSID, for example, information of all APs defined in the IEEE 802.11 system. However, the second beacon frames 554 and 560 and the third beacon frames 556 and 562 include specific information for the terminal groups corresponding to the respective beacon frames, excluding the common information included in the first beacon frames 552 and 558. For example, the second beacon frames 554 and 560 and the third beacon frames 556 and 562 include information that informs time intervals from the second beacon frame 554 and the third beacon frame 556 to the next first beacon frame 558, to the corresponding terminal groups.

In order to distinguish the beacon frames added and transmitted during the beacon interval 500 of the reference beacon frames 502 and 504 according to the virtual APs, that is, the first beacon frames 552 and 558, the second beacon frames 554 and 560 and the third beacon frames 556 and 562, the beacon frames 552, 554, 556, 558, 560 and 562 include beacon interval information, beacon duration information, beacon offset information, terminal group information, and so forth.

In detail, the beacon interval information includes a beacon interval which indicates a time interval between beacon frames corresponding to the same virtual AP. For example, the beacon interval information includes information indicating that the beacon interval of the first beacon frames 552 and 558, the beacon interval of the second beacon frames 554 and 560 and the beacon interval 550 of the third beacon frames 556 and 562 are 100 ms.

The beacon duration information includes a beacon duration which indicates a time interval from a random corresponding beacon frame to a next beacon frame of another virtual AP. For example, the beacon duration information includes information indicating that a beacon duration 580 as the time interval from the first beacon frame 552 to the next second beacon frame 554, the time interval from the second beacon frame 554 to the next third beacon frame 556 or the time interval from the third beacon frame 556 to the next first beacon frame 558 is 33.3 ms.

The beacon offset information includes beacon offsets which indicate time differences from the reference beacon frames 502 and 504 as beacon frames corresponding to one virtual AP in the case where the one virtual AP is included in one physical AP, to beacon frames corresponding to respective virtual APs. For example, since the first beacon frames 552 and 558 corresponding to the first virtual AP correspond to the reference beacon frames 502 and 504, the beacon offset information includes information indicating that the beacon offset of the first beacon frames 552 and 558 is 0 ms. In the case where the terminals included in the first terminal group has a higher connection priority than the terminals included in the second terminal group and the third terminal group, the first virtual AP transmits the reference beacon frames 502 and 504 as the first beacon frames 552 and 558, that is, transmits the first beacon frames 552 and 558 corresponding to the reference beacon frames 502 and 504 to the terminal group which has a highest connection priority. The beacon offset of the second beacon frames 554 and 560 corresponding to the second virtual AP includes information indicating that a time difference from the first beacon frames 552 and 558 as the reference beacon frames 502 and 504 is 33.3 ms, and the beacon offset of the third beacon frames 556 and 562 corresponding to the third virtual AP includes information indicating that a time difference from the first beacon frames 552 and 558 as the reference beacon frames 502 and 504 is 66.6 ms.

The beacon offset may be time information from a beacon frame corresponding to a terminal group to a next reference beacon frame. In other words, as the beacon offsets included in the second beacon frames 554 and 560 and the third beacon frames 556 and 562, information that informs times from the second beacon frame 554 and the third beacon frame 556 to the next first beacon frame 558, to the corresponding terminal groups, may be included.

Furthermore, the terminal group information includes information which indicates a network situation for a random corresponding virtual AP and information for the numbers of the terminals included in the terminal groups corresponding to the virtual APs. For example, the terminal group information includes information for the numbers of terminals which are currently connected to the corresponding virtual APs, that is, the numbers of terminals which are included in the corresponding terminal groups, or the numbers of terminals which may be additionally connected to the corresponding virtual APs.

In this way, in the communication system in accordance with the embodiment of the present invention, as described above, in order to ensure that a plurality of terminals are connected to one AP and normally transmit and receive large data through a new frequency band, the plurality of terminals are grouped into terminal groups by using terminal information received from the respective terminals, and virtual APs respectively corresponding to the terminal groups are configured in the one AP. Moreover, the virtual APs included in the one AP perform the functions of APs. Namely, as described above, the virtual APs respectively transmit the beacon frames to the corresponding terminal groups, and the terminals included in the terminal groups verify AP information, in particular, information of the virtual APs corresponding to them and information of their terminal groups, through the beacon frames, are connected to the virtual APs corresponding to their terminal groups, and transmit and receive data to and from the one AP.

Although it was exemplarily described with reference to FIG. 5 that, in the communication system in accordance with the embodiment of the present invention, in the case where beacon frames are transmitted by configuring virtual APs in one physical AP, the reference beacon frames' beacon interval of 100 ms is maintained as it is and all the virtual APs divide the beacon interval of the reference beacon frames by 3 to the same beacon duration of 33.33 ms, it is to be noted that various modifications may be made. That is to say, in the communication system in accordance with the embodiment of the present invention, while maintaining the reference beacon frames' beacon interval of 100 ms, the beacon durations of the respective virtual APs may be allocated to be different from one another. In addition, in the communication system in accordance with the embodiment of the present invention, the beacon intervals of the virtual APs may be extended in such a way as not to maintain the beacon interval of the reference beacon frames as it is, for example, not to 100 ms but to 200 ms or 300 ms. Hereinbelow, a case in which the beacon intervals of virtual APs are extended to 300 ms, that is, the virtual APs extend the beacon interval of reference beacon frames, in a communication system in accordance with an embodiment of the present invention will be described in detail with reference to FIG. 6.

Figure 6:
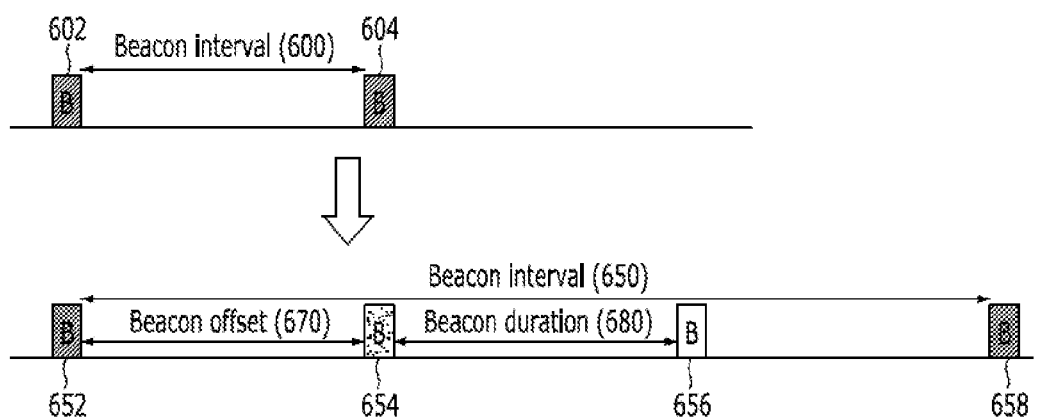

FIG. 6 is a diagram schematically showing transmission and reception of beacon frames in a communication system in accordance with an embodiment of the present invention. FIG. 6 is a diagram schematically showing a case in which virtual APs transmit and receive beacon frames by extending the beacon interval of the reference beacon frames in the transmission and reception of the beacon frames in FIG. 5.

Referring to FIG. 6, in a communication system, for example, a WLAN system, as aforementioned above, one physical AP transmits beacon frames 602 and 604 for the purpose of broadcasting the information of the AP. The beacon frames 602 and 604 are periodically transmitted with a predetermined beacon interval 600.

For example, to be described in detail, in the communication system, in the case where a beacon interval 600 of reference beacon frames 602 and 604 transmitted by one physical AP is 100 ms, when a plurality of terminals which are to be connected to the one physical AP are grouped into 3 terminal groups by using the terminal information received from the plurality of terminals as described above, 3 virtual APs respectively corresponding to the 3 terminal groups, that is, a first virtual AP corresponding to a first terminal group, a second virtual AP corresponding to a second terminal group and a third virtual AP corresponding to a third terminal group are configured in the one physical AP. In order to configure such 3 virtual APs, in the communication system, the beacon interval 600 of the reference beacon frames 602 and 604, which are to be transmitted by the one physical AP, is extended. For example, by extending the beacon interval 600 of 100 ms to a beacon interval 650 of 300 ms, beacon frames are transmitted.

That is to say, in the communication system, the first virtual AP transmits first beacon frames 652 and 658 to the first terminal group, the second virtual AP transmits a second beacon frame 654 to the second terminal group, and the third virtual AP transmits a third beacon frame 656 to the third terminal group. The first beacon frames 652 and 658, the second beacon frame 654 and the third beacon frame 656 have the beacon interval 650 that is acquired by extending the beacon interval 600 of the reference beacon frames 602 and 604, for example, of 300 ms.

In order to distinguish the beacon frames transmitted during the beacon interval 650 acquired by extending the beacon interval 600 of the reference beacon frames 602 and 604 according to the virtual APs, that is, the first beacon frames 652 and 658, the second beacon frame 654 and the third beacon frames 656, the beacon frames 652, 654, 656 and 658 include beacon interval information, beacon duration information, beacon offset information, terminal group information, and so forth.

In detail, the beacon interval information includes a beacon interval which indicates a time interval between beacon frames corresponding to the same virtual AP. For example, the beacon interval information includes information indicating that the beacon interval 650 of the first beacon frames 652 and 658, the beacon interval of the second beacon frame 654 and the beacon interval of the third beacon frame 656 are 300 ms.

The beacon duration information includes a beacon duration which indicates a time interval from a random corresponding beacon frame to a next beacon frame of another virtual AP. For example, the beacon duration information includes information indicating that a beacon duration 680 as the time interval from the first beacon frame 652 to the next second beacon frame 654, the time interval from the second beacon frame 654 to the next third beacon frame 656 and the time interval from the third beacon frame 656 to the next first beacon frame 658 is 100 ms, that is, is the same as the beacon interval 600 of the reference beacon frames 602 and 604.

The beacon offset information includes beacon offsets which indicate time differences from the reference beacon frames 602 and 604 as beacon frames corresponding to one virtual AP in the case where one virtual AP is included in one physical AP, to beacon frames corresponding to corresponding virtual APs. For example, since the first beacon frame 652 corresponding to the first virtual AP corresponds to the reference beacon frames 602, the beacon offset information includes information indicating that the beacon offset of the first beacon frame 652 is 0 ms. The beacon offset of the second beacon frame 654 corresponding to the second virtual AP includes information indicating that a time difference from the first beacon frame 652 as the reference beacon frame 602 is 100 ms, and the beacon offset of the third beacon frame 656 corresponding to the third virtual AP includes information indicating that a time difference from the first beacon frame 652 as the reference beacon frame 602 is 200 ms.

Furthermore, the terminal group information includes information that indicates a network situation for a random corresponding virtual AP and information for the numbers of the terminals included in the terminal groups corresponding to the virtual APs. For example, the terminal group information includes information for the numbers of terminals which are currently connected to the corresponding virtual APs, that is, the numbers of terminals which are included in the corresponding terminal groups, or the numbers of terminals which may be additionally connected to the corresponding virtual APs.

In this way, in the communication system in accordance with the embodiment of the present invention, as described above, in order to ensure that a plurality of terminals are connected to one AP and normally transmit and receive large data through a new frequency band, the plurality of terminals are grouped into terminal groups by using terminal information received from the respective terminals, and virtual APs respectively corresponding to the terminal groups are configured in the one AP. Moreover, the virtual APs included in the one AP perform the functions of APs. Namely, as described above, the virtual APs respectively transmit the beacon frames to the corresponding terminal groups, and the terminals included in the terminal groups verify AP information, in particular, information of the virtual APs corresponding to them and information of their terminal groups, through the beacon frames, are connected to the virtual APs corresponding to their terminal groups, and transmit and receive data to and from the one AP.

Further, in the communication system in accordance with the embodiment of the present invention, as described above with reference to FIG. 5, the virtual APs respectively corresponding to the terminal groups transmit corresponding beacon frames to the terminals included in the terminal groups during the beacon interval of the reference beacon frames. In particular, the virtual APs transmit the beacon frames by dividing the beacon interval of the reference beacon frames according to the virtual APs corresponding to the number of the terminal groups. Moreover, as described above with reference to FIG. 6, the virtual APs respectively corresponding to the terminal groups transmit corresponding beacon frames to the terminals included in the terminal groups by extending the beacon interval of the reference beacon frames. In particular, the beacon interval of the beacon frames of the virtual APs is extended through extending the beacon interval of the reference beacon frames, and the virtual APs transmit the beacon frames by setting the beacon duration to correspond to the beacon interval of the reference beacon frames.

In this way, in the communication system in accordance with the embodiment of the present invention, the AP is flexibly managed by expecting maximum transmission delay or packet collision probability through controlling the beacon interval and the beacon duration of the virtual APs, so that collision upon connection of the terminals can be maximally avoided to normally transmit and receive data. That is to say, in the communication system in accordance with the embodiment of the present invention, due to the fact that the one physical AP groups the plurality of terminals into the terminal groups by using the terminal information, the virtual APs are configured in the one physical AP according to the grouping of the plurality of terminals and the terminal groups are allocated to the virtual APs and are connected in the time division scheme, it is possible to overcome the disadvantages of the CSMA scheme which may occur in the case where the plurality of terminals are to be connected. In this regard, in the case where one terminal is allocated to one virtual AP, that is, only one terminal is included in one terminal group, the TMDA (time division multiple access) scheme results rather than the CSMA scheme.

Furthermore, in the communication system in accordance with the embodiment of the present invention, as aforementioned above, in the case where the plurality of terminals are grouped for transmission of the beacon frames in the virtual APs included in the one physical AP, the one physical AP, which has received the terminal information, for example, data transmission periods and QoS parameters such as acceptable transmission delay ranges or priorities of data to be transmitted and received, from the respective terminals, groups the plurality of terminals into the terminal groups according to a predetermined rule by using the terminal information, sets the beacon interval and the beacon duration of the beacon frames to be transmitted by the virtual APs corresponding to the respective terminal groups, and determines the numbers of terminals to be included in the respective terminal groups.

For example, in the communication system, in the case where the AP receives periodic information of data among service quality information, the AP sets the beacon interval and the beacon duration in consideration of not only the number of the terminal groups and the numbers of terminals in the respective terminal groups but also periodicity. For instance, if a sensor terminal with a periodicity of 100 ms exists, since the channel use authority of a virtual AP should be acquired at least once in 100 ms, a beacon interval should be shorter than 100 ms. Also, in the case where data has a periodicity, by utilizing the pattern in which a terminal operates in an active mode only when a virtual AP occupies a channel with a specified period and otherwise operates in a sleep mode, utilization may be made for power save. Even in the case of a terminal which enters a power save mode, as the occasion demands, in order to receive a first beacon frame which has all information of an AP, it is necessary for the terminal to be awaked at a corresponding time. To this end, a time is needed to a next first beacon frame. Such time to a next first beacon frame is included as a beacon offset as described above.

Besides, in the communication system in accordance with the embodiment of the present invention, after configuring the virtual APs in the one physical AP, the terminal groups corresponding to the virtual APs are formed, and at this time, the plurality of terminals may be actively connected by selecting the virtual APs. To this end, the terminals effectively utilize information for a network situation which is included in the beacon frames. For example, in consideration of the group information, that is, values indicating the network situation of the corresponding virtual APs, for instance, the numbers of terminals which are currently connected to the virtual APs or the numbers of terminals which are additionally connectable, a random terminal finds and is connected to a virtual AP which has a substantial margin in terms of network. According to this fact, given channels are efficiently utilized through load balancing of the virtual APs. One or both of a virtual AP configuring scheme such as group setting and terminal allocation in the AP and a scheme for a terminal to be actively connected to a desired virtual AP may be used according to a network situation.

Namely, in the communication system in accordance with the embodiment of the present invention, for example, in the WLAN system, the AP is controlled to effectively support the plurality of terminals. As a consequence, it is possible to prevent the occurrence of a situation where a collision occurs and data are not actually transmitted in the CSMA scheme in the case where a plurality of terminals exist, and the plurality of terminals may effectively utilize the given channels. Hereinbelow, a data transmission apparatus for transmitting beacon frames, that is, an AP, in a communication system in accordance with an embodiment of the present invention will be described in detail with reference to FIG. 7.

Figure 7:
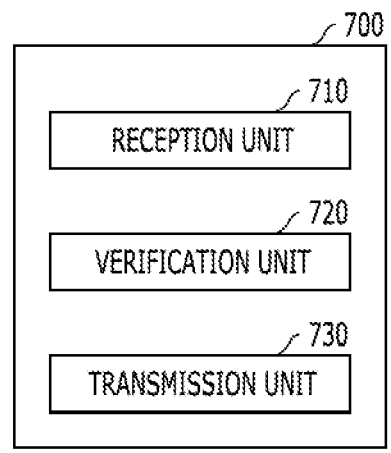
FIG. 7 is a diagram schematically showing the structure of a data transmission apparatus in a communication system in accordance with an embodiment of the present invention.

FIG. 7 is a diagram schematically showing the structure of a data transmission apparatus in a communication system in accordance with an embodiment of the present invention. FIG. 7 is a diagram schematically showing the structure of an AP which receives terminal information from a plurality of terminals and transmits beacon frames as described above.

Referring to FIG. 7, a data transmission apparatus 700, that is, an AP, includes a reception unit 710 configured to receive terminal information from a plurality of terminals which are to transmit and receive data through an available frequency band, for example, a new frequency band different from a frequency band used for transmitting and receiving data in an existing system, a verification unit 720 configured to verify the terminal information received from the plurality of terminals and generate terminal groups of the plurality of terminals, and a transmission unit 730 configured to transmit beacon frames to the terminals included in the terminal groups.

The reception unit 710 receives terminal information from a plurality of terminals which are to transmit and receive data through an available frequency band, for example, a new frequency band different from a frequency band used for transmitting and receiving data in the IEEE 802.11n system and the IEEE 802.11ac system as an existing WLAN system.

The verification unit 720 verifies the terminal information received from the plurality of terminals and groups the plurality of terminals into terminal groups. Also, the verification unit 720 configures virtual APs corresponding to the terminal groups, in one physical AP, that is, the AP itself, verifies the virtual APs in the one physical AP, and sets the beacon interval of reference beacon frames corresponding to virtual APs included in the AP, the beacon interval and beacon duration of the beacon frames of the virtual APs, terminal group information, etc.

The transmission unit 730 transmits the beacon frames of the virtual APs to the terminals which are included in the terminal groups. Since the beacon frames in the virtual APs and transmission and reception of the beacon frames have been described above in detail, concrete descriptions thereof will be omitted herein. Hereinbelow, operations in which an AP transmits beacon frames in a communication system in accordance with an embodiment of the present invention will be described in detail with reference to FIG. 8.

Figure 8:
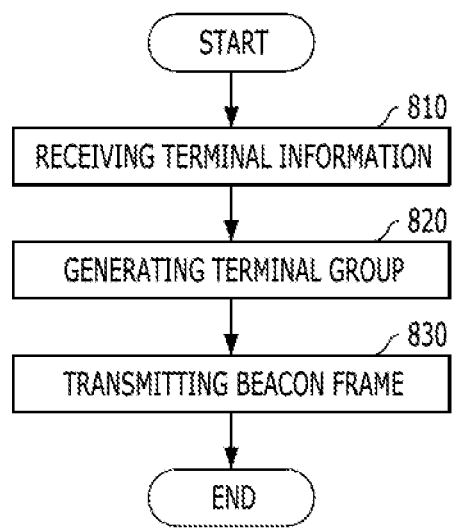
FIG. 8 is a diagram schematically showing a data transmitting procedure in the data transmission apparatus in a communication system in accordance with an embodiment of the present invention.

FIG. 8 is a diagram schematically showing a data transmitting procedure in the data transmission apparatus in a communication system in accordance with an embodiment of the present invention. FIG. 8 is a diagram schematically showing a procedure in which an AP having received terminal information from a plurality of terminals transmits beacon frames as described above.

Referring to FIG. 8, in step 810, a data transmission apparatus, that is, an AP, receives terminal information from a plurality of terminals which are to transmit and receive data through an available frequency band, for example, a new frequency band different from a frequency band used for transmitting and receiving data in the IEEE 802.11n system and the IEEE 802.11ac system as an existing WLAN system.

In step 820, the data transmission apparatus verifies the terminal information received from the plurality of terminals, and groups the plurality of terminals into terminal groups, that is, generates the terminal groups. Also, the AP configures virtual APs corresponding to the terminal groups, in one physical AP, that is, the AP itself, verifies the virtual APs in the one physical AP, and sets the beacon interval of reference beacon frames corresponding to virtual APs included in the AP, the beacon interval and beacon duration of the beacon frames of the virtual APs, terminal group information, etc.

In step 830, the data transmission apparatus transmits the beacon frames of the virtual APs to the terminals which are included in the terminal groups. Since the beacon frames in the virtual APs and transmission and reception of the beacon frames have been described above in detail, concrete descriptions thereof will be omitted herein. Hereinbelow, a data reception apparatus for receiving beacon frames, that is, a terminal, in a communication system in accordance with an embodiment of the present invention will be described in detail with reference to FIG. 9.

Figure 9:
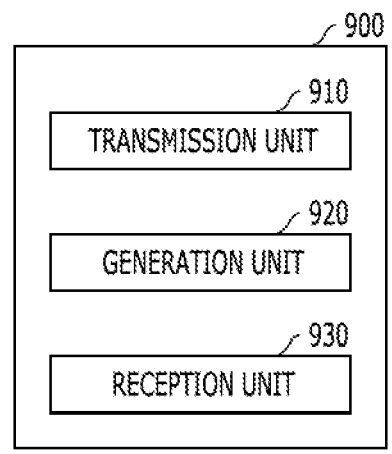
FIG. 9 is a diagram schematically showing the structure of a data reception apparatus in a communication system in accordance with an embodiment of the present invention.

FIG. 9 is a diagram schematically showing the structure of a data reception apparatus in a communication system in accordance with an embodiment of the present invention. FIG. 9 is a diagram schematically showing the structure of a terminal which receives beacon frames from a virtual AP included in one AP as described above.

Referring to FIG. 9, a data reception apparatus 900, that is, a terminal, includes a transmission unit 910 configured to transmit terminal information to an AP to transmit and receive data through an available frequency band, for example, a new frequency band different from a frequency band used for transmitting and receiving data in an existing system, a generation unit 920 configured to generate the terminal information, and a reception unit 930 configured to receive beacon frames from virtual APs included in terminal groups and corresponding to the terminal groups in the AP, according to the terminal information.

The generation unit 920 generates terminal information of the terminal itself in a new frequency band to transmit and receive data through an available frequency band, for example, a new frequency band different from a frequency band used for transmitting and receiving data in the IEEE 802.11n system and the IEEE 802.11ac system as an existing WLAN system.

The transmission unit 910 transmits the terminal information to the AP upon initial connection to the AP.

The reception unit 930 receives beacon frames from a virtual AP corresponding to a terminal group in which the terminal itself is included, according to the terminal information. Since the beacon frames in the virtual AP and transmission and reception of the beacon frames have been described above in detail, concrete descriptions thereof will be omitted herein. Hereinbelow, operations in which a terminal receives beacon frames in a communication system in accordance with an embodiment of the present invention will be described in detail with reference to FIG. 10.

Figure 10:
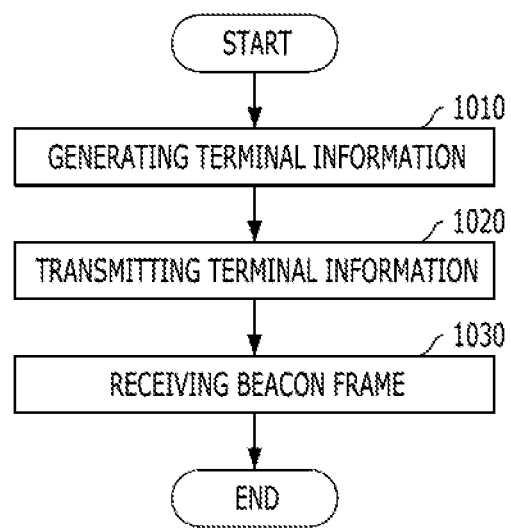
FIG. 10 is a diagram schematically showing a data receiving procedure in the data reception apparatus in a communication system in accordance with an embodiment of the present invention.

FIG. 10 is a diagram schematically showing a data receiving procedure in the data reception apparatus in a communication system in accordance with an embodiment of the present invention. FIG. 10 is a diagram schematically showing a procedure in which beacon frames are received from a virtual AP included in one AP as described above.

Referring to FIG. 10, in step 1010, a data reception apparatus, that is, a terminal, generates terminal information of the terminal itself in a new frequency band to transmit and receive data through an available frequency band, for example, a new frequency band different from a frequency band used for transmitting and receiving data in the IEEE 802.11n system and the IEEE 802.11ac system as an existing WLAN system.

In step 1020, the data reception apparatus transmits the terminal information to the AP upon initial connection to the AP.

In step 1030, the data reception apparatus receives beacon frames from a virtual AP corresponding to a terminal group in which the terminal itself is included, according to the terminal information. Since the beacon frames in the virtual AP and transmission and reception of the beacon frames have been described above in detail, concrete descriptions thereof will be omitted herein.

As is apparent from the above descriptions, in the communication system in accordance with the embodiments of the present invention, for example, the WLAN system, in order to effectively support a plurality of terminals, virtual APs which perform the functions of APs in the same manner are configured in one physical AP, and the virtual APs included in the one AP transmit and receive corresponding beacon frames to and from the plurality of terminals. As a consequence, even in the case where the plurality of terminals exist and try to be connected to the one AP, it is possible to prevent the occurrence of a situation where a collision occurs and data are not actually transmitted in the CSMA scheme, so that data can be normally transmitted and received and the plurality of terminals can effectively utilize given channels.

In the embodiments of the present invention, in the communication system, frames in the new frequency band are configured, and beacon frames with beacon offsets are transmitted and received to and from a plurality of terminals, by terminal groups, through the frames configured in this way. As a consequence, large data can be normally transmitted and received to and from the plurality of terminals in the new frequency band while maintaining a quality of service.

While the present invention has been described with respect to the specific embodiments, it will be apparent to those skilled in the art that various changes and modifications may be made without departing from the spirit and scope of the invention as defined in the following claims.

What is claimed is:

1. A data transmission apparatus in a communication system, comprising:
   a reception unit configured to receive terminal information from a plurality of terminals through a frequency band for transmitting and receiving data between the terminals and one AP (access point);
   a verification unit configured to verify the terminal information, group the terminals into terminal groups based on the terminal information, and verify virtual APs which respectively correspond to the terminal groups, in the AP; and
   a transmission unit configured to transmit beacon frames in the virtual APs, to terminals included in the terminal groups,
   wherein the beacon frames include beacon interval information, beacon duration information, beacon offset information, and terminal group information,
   wherein the AP is a single physical AP including the virtual APs and performing functions of the virtual APs,
   wherein the virtual APs respectively administer corresponding respective terminal groups, and respectively transmit corresponding respective beacon frames to the corresponding respective terminal groups, and
   wherein the virtual APs use the frequency band by dividing the frequency band being used by the AP in a time division scheme.

2. The data transmission apparatus of claim 1, wherein the beacon interval information includes a beacon interval which indicates a time interval between beacon frames corresponding to the same virtual AP, in the virtual APs.

3. The data transmission apparatus of claim 1, wherein the beacon duration information includes a beacon duration which indicates a time interval between a beacon frame in a first virtual AP and a beacon frame in a second virtual AP next to the first virtual AP, among the virtual APs.

4. The data transmission apparatus of claim 1, wherein the beacon offset information includes a beacon offset which indicates a time difference between a reference beacon frame in the AP and a beacon frame in a first virtual AP among the virtual APs.

5. The data transmission apparatus of claim 1, wherein the terminal group information includes information which indicates a network situation in the virtual APs and information for the numbers of terminals included in the terminal groups corresponding to the virtual APs and the numbers of terminals capable of being additionally connected.

6. The data transmission apparatus of claim 1, wherein the transmission unit transmits respective beacon frames in the virtual APs during the beacon interval of reference beacon frames in the AP.

7. The data transmission apparatus of claim 1, wherein the transmission unit transmits respective beacon frames in the virtual APs, by extending the beacon interval of reference beacon frames in the AP and setting the beacon interval of the reference beacon frames as the beacon duration.

8. The data transmission apparatus of claim 1, wherein the terminal information includes subscription information of the terminals and service quality information which indicates data transmission periods, transmission delays and data priorities.

9. The data transmission apparatus of claim 1, wherein the transmission unit transmits beacon frames in the AP, to terminals included in a terminal group with a highest connection priority among the terminal groups.

10. A data transmitting method in a communication system, comprising:
   receiving terminal information from a plurality of terminals through a frequency band for transmitting and receiving data between the plurality of terminals and one AP (access point);
   verifying the terminal information, grouping the terminals into terminal groups based on the terminal information, and verifying virtual APs which respectively correspond to the terminal groups, in the AP; and
   transmitting beacon frames in the virtual APs, to the terminals included in the terminal groups,
   wherein the beacon frames include beacon interval information, beacon duration information, beacon offset information, and terminal group information,
   wherein the AP is a single physical AP including the virtual APs and performing functions of the virtual APs,
   wherein the virtual APs respectively administer corresponding respective terminal groups, and respectively transmit corresponding respective beacon frames to the corresponding respective terminal groups, and
   wherein the virtual APs use the frequency band by dividing the frequency band being used by the AP in a time division scheme.

11. The method of claim 10, wherein the beacon interval information includes a beacon interval which indicates a time interval between beacon frames corresponding to the same virtual AP, in the virtual APs.

12. The method of claim 10, wherein the beacon duration information includes a beacon duration which indicates a time interval between a beacon frame in a first virtual AP and a beacon frame in a second virtual AP next to the first virtual AP, among the virtual APs.

13. The method of claim 10, wherein the beacon offset information includes a beacon offset which indicates a time difference between a reference beacon frame in the AP and a beacon frame in a first virtual AP among the virtual APs.

14. The method of claim 10, wherein the terminal group information includes information which indicates a network situation in the virtual APs and information for the numbers of terminals included in the terminal groups corresponding to the virtual APs and the numbers of terminals capable of being additionally connected.

15. The method of claim 10, wherein said transmitting transmits respective beacon frames in the virtual APs during the beacon interval of reference beacon frames in the AP.

16. The method of claim 10, wherein said transmitting transmits respective beacon frames in the virtual APs, by extending the beacon interval of reference beacon frames in the AP and setting the beacon interval of the reference beacon frames as the beacon duration.

17. The method of claim 10, wherein the terminal information includes subscription information of the terminals and service quality information which indicates data transmission periods, transmission delays and data priorities.

18. The method of claim 10, wherein said transmitting transmits beacon frames in the AP, to terminals included in a terminal group with a highest connection priority among the terminal groups.

19. A data reception apparatus in a communication system, comprising:
   a generation unit configured to generate terminal information in a new frequency band for transmitting and receiving data between a plurality of terminals and one AP (access point);
   a transmission unit configured to transmit the terminal information to the AP; and
   a reception unit configured to receive beacon frames from a virtual AP of a terminal group corresponding to the terminal information in the AP,
   wherein the terminals are grouped into terminal groups based on the terminal information,
   wherein the AP is a single physical AP including the virtual APs and performing functions of the virtual APs,
   wherein the virtual APs respectively administer corresponding respective terminal groups, and respectively transmit corresponding respective beacon frames to the corresponding respective terminal groups,
   wherein the virtual APs use the frequency band by dividing the frequency band being used by the AP in a time division scheme,
   wherein terminals included in the terminal groups are connected to the AP, by respectively receiving the corresponding respective beacon frames from corresponding respective virtual APs, and
   wherein the beacon frames include beacon interval information, beacon duration information, beacon offset information, and terminal group information.

20. A data receiving method in a communication system, comprising:
   generating terminal information in a frequency band for transmitting and receiving data between a plurality of terminals and one AP (access point);
   transmitting the terminal information to the AP; and
   receiving beacon frames from a virtual AP of a terminal group corresponding to the terminal information in the AP,
   wherein the terminals are grouped into terminal groups based on the terminal information,
   wherein the AP is a single physical AP including the virtual APs and performing functions of the virtual APs, wherein the virtual APs respectively administer corresponding respective terminal groups, and respectively transmit corresponding respective beacon frames to the corresponding respective terminal groups, wherein the virtual APs use the frequency band by dividing the frequency band being used by the AP in a time division scheme, wherein terminals included in the terminal groups are connected to the AP, by respectively receiving the corresponding respective beacon frames from corresponding respective virtual APs, and wherein the beacon frames include beacon interval information, beacon duration information, beacon offset information, and terminal group information.

* * * * *